US008662566B1

(12) United States Patent
Edwards et al.

(10) Patent No.: US 8,662,566 B1
(45) Date of Patent: Mar. 4, 2014

(54) MULTI EXTENSION FRONT BUMPER BEAM

(71) Applicant: Honda Motor Co., Ltd., Tokyo (JP)

(72) Inventors: David M. Edwards, Marysville, OH (US); Patrick J. Ellison, Dublin, OH (US); Walter Thom, Seattle, WA (US); Eric M. Heitkamp, Columbus, OH (US); William W. Brewer, Cuyahoga Falls, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/834,145

(22) Filed: Mar. 15, 2013

(51) Int. Cl.
    *B60R 19/34* (2006.01)
(52) U.S. Cl.
    USPC ............. 296/187.09; 296/193.09; 293/133; 293/154
(58) Field of Classification Search
    USPC ............ 296/187.09, 193.1, 193.09; 293/133, 293/135, 136, 150, 154, 155, 102, 132
    See application file for complete search history.

(56) References Cited

U.S. PATENT DOCUMENTS

| 1,517,887 | A  | * | 12/1924 | Berry ........................... 293/138 |
| 6,957,846 | B2 |   | 10/2005 | Saeki |
| 8,056,926 | B2 |   | 11/2011 | Okabe et al. |
| 8,152,211 | B2 |   | 4/2012  | Klimek |
| 8,172,286 | B2 |   | 5/2012  | Klimek |
| 8,256,831 | B2 |   | 9/2012  | Abe et al. |
| 2008/0290674 | A1 | * | 11/2008 | Yang et al. ................. 293/155 |
| 2009/0140546 | A1 |   | 6/2009  | Okabe et al. |
| 2012/0007373 | A1 |   | 1/2012  | Boettcher et al. |
| 2012/0248820 | A1 |   | 10/2012 | Yasui et al. |
| 2013/0320710 | A1 | * | 12/2013 | Watanabe ................. 296/187.09 |

* cited by examiner

*Primary Examiner* — Jason S Morrow
(74) *Attorney, Agent, or Firm* — Rankin, Hill & Clark LLP

(57) ABSTRACT

A vehicle body front structure includes a front end frame assembly, a bumper beam, left and right inner extension members, and left and right outer extension members. The front end frame assembly is disposed adjacent a forward end of the vehicle. The bumper beam is disposed forward of the front end frame assembly. The left and right inner extension members connect the bumper beam with the front end frame assembly. The left and right outer extension members are disposed on respective external sides of the left and right inner extension members and connect the bumper beam with the front end frame assembly. Each outer extension member includes a forward end section for connecting with the bumper beam, a rear end section having connection locations for connecting with the front end frame assembly and a curved section disposed between the forward end section and the rear end section.

20 Claims, 6 Drawing Sheets

MULTI EXTENSION FRONT BUMPER BEAM

BACKGROUND

Known vehicle body front structures often include a front end frame assembly extending in a vehicle-widthwise, also referred to as lateral, direction. Such vehicle body front structures can include left and right front side frames and left and right upper frames provided on external sides of the front side frames. External impact absorbers, also referred to as extension members, are provided on front ends of the front side frames and upper frames and a bumper beam is connected to the front of the front end frame assembly via these extension members.

The extension members can each be in the form of a crush can, which can provide for controlled deformation when the bumper beam is impacted. It can be difficult, however, to design a crush can to address both low speed and high speed crash conditions. Additionally, it can be difficult to design extension members to accommodate a narrow offset collision or a small offset impact area.

SUMMARY

A vehicle body front structure includes a front end frame assembly, a bumper beam, left and right inner extension members, and left and right outer extension members. The front end frame assembly is disposed adjacent a forward end of the vehicle. The bumper beam is disposed forward of the front end frame assembly. The left and right inner extension members connect the bumper beam with the front end frame assembly. The left and right outer extension members are disposed on respective external sides of the left and right inner extension members and connect the bumper beam with the front end frame assembly. Each outer extension member includes a forward end section for connecting with the bumper beam, a rear end section having connection locations for connecting with the front end frame assembly and a curved section disposed between the forward end section and the rear end section. The rear end section has a plate-like configuration having a vertical dimension greater than a horizontal dimension in a lateral direction of the vehicle. A vertical plane having the vertical dimension thereon is generally parallel to a longitudinal direction of the vehicle.

Another example of a vehicle body front structure includes a front end frame assembly, a bumper beam, left and right inner extension members, and left and right outer extension members. The front end frame assembly is disposed adjacent a forward end of the vehicle. The front end frame assembly includes left and right longitudinally extending front side frames and left and right upper frames disposed on respective external sides of the left and right front side frames. The bumper beam is disposed forward of the front end frame assembly. The left and right inner extension members connect the bumper beam with the front end frame assembly. The left and right outer extension members are disposed on respective external sides of the left and right inner extension members and connect the bumper beam with the front end frame assembly. Each outer extension member includes a forward end section for connecting with the bumper beam, a rear end section having connection locations for connecting with a respective upper frame and a curved section disposed between the forward end section and the rear end section. At least the curved section and the rear end section have a plate-like configuration having a vertical dimension greater than a horizontal dimension. The curved section curves laterally inwardly from the forward section and the rear section.

Another example of a vehicle body front structure includes a front end frame assembly, a bumper beam, left and right inner extension members, and left and right outer extension members. The front end frame assembly is disposed adjacent a forward end of the vehicle. The front end frame assembly includes left and right longitudinally extending front side frames and left and right upper frames disposed on respective external sides of the left and right front side frames. The bumper beam is disposed forward of the front end frame assembly. The left and right inner extension members connect the bumper beam with the front end frame assembly. The left and right outer extension members are disposed on respective external sides of the left and right inner extension members and connect the bumper beam with the front end frame assembly. Fasteners extend laterally inwardly from the upper frames. Each outer extension member includes a forward end section for connecting with the bumper beam, a rear end section having openings each for receiving a respective fastener for connecting with a respective upper member, and a curved section disposed between the forward end section and the rear end section.

DETAILED DESCRIPTION

Figure 1:
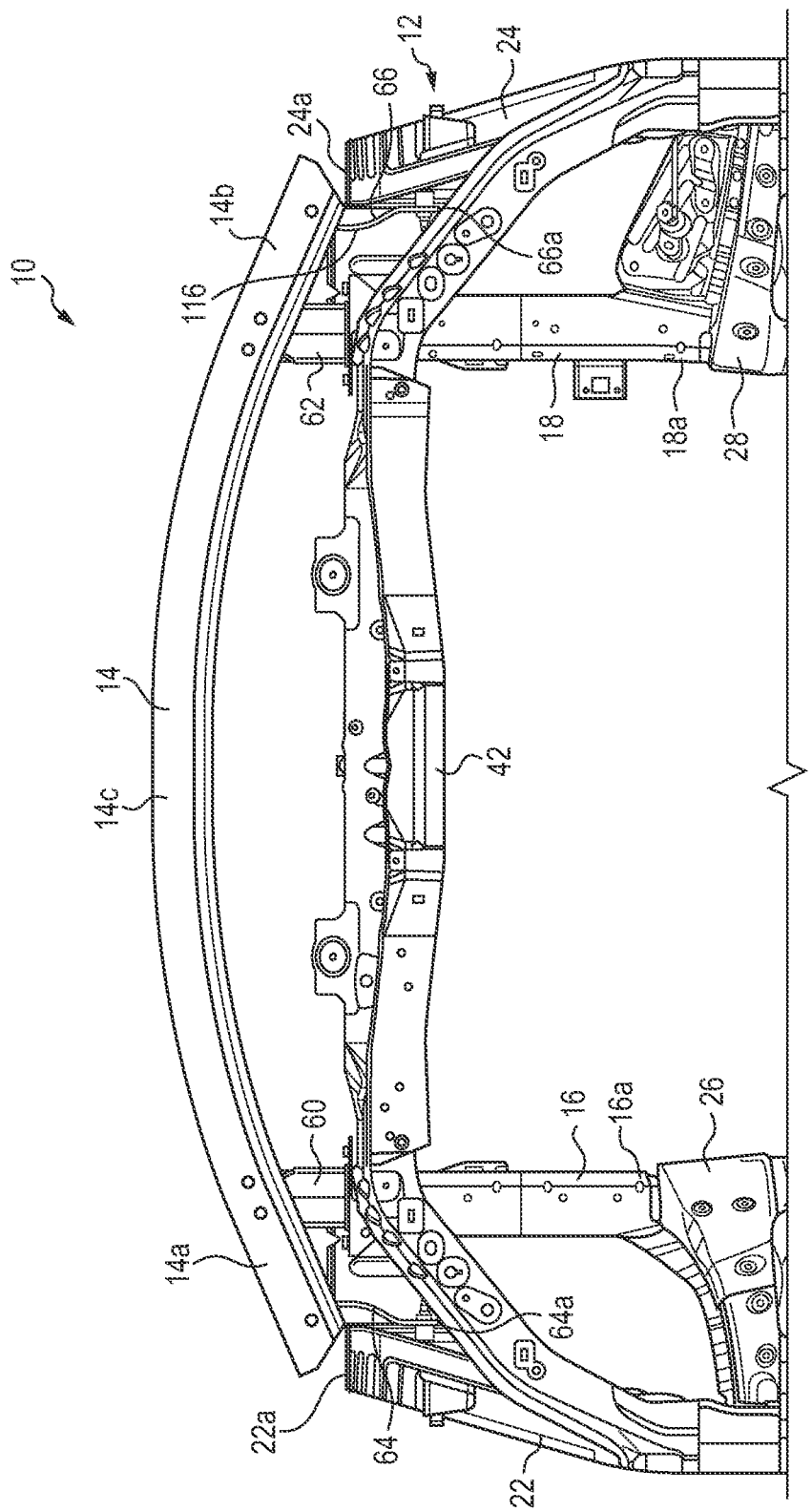
FIG. 1 is a top plan view of a vehicle body front structure.

FIG. 1 depicts a vehicle body front structure 10 for a vehicle (not shown). The vehicle body front structure 10 includes a front end frame assembly 12 disposed adjacent a forward end of the vehicle and a bumper beam 14 disposed forward of the front end frame assembly 12. The vehicle body front structure 10 typically defines an engine compartment of the vehicle.

The front end frame assembly 12 includes left and right longitudinally extending front side frames 16, 18 on the left and right sides of the front of the vehicle. Left and right upper frames 22, 24 are disposed on respective external sides of the left and right front side frames 16, 18. A left upper frame 22 is provided on the outer side of the left front side frame 16 with respect to the vehicle width (lateral) direction. The right upper frame 24 is provided on the outer side of the right front side frame 18 with respect to the vehicle width (lateral) direction. The front side frames 16, 18 extend in a longitudinal direction of the vehicle. The rear end 16a of the left front side frame 16 connects with a left outrigger 26. A rear end 18a of the right front side frame 18 is connected with a right outrigger 28. The left and right upper frames 22, 24 extend in an upward slope toward the rear of the vehicle (see FIG. 6). A rear end of the left upper frame 22 connects with a left front pillar (not shown). A rear end of the right upper frame 24 connects with a right front pillar (now shown).

Figure 6:
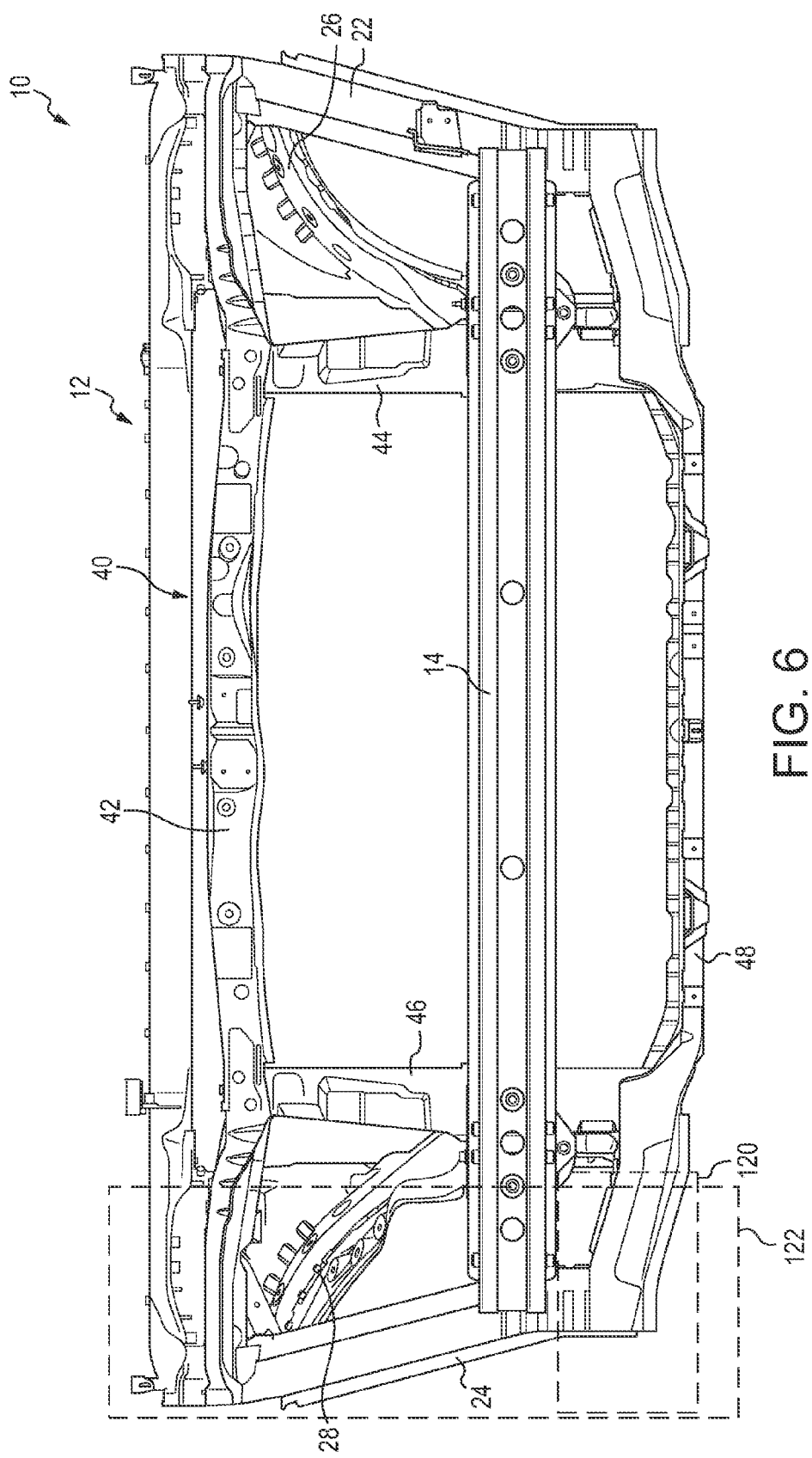
FIG. 6 is a front end view of the vehicle body front structure depicted in FIG.

With reference to FIG. 6, the front end frame assembly 12 can further include a front bulkhead 40. A radiator (not shown) can be positioned forward of the front bulkhead 40. The front bulkhead 40 can be a substantially rectangular frame shape including an upper member 42, a left stay 44, a right stay 46, and a lower member 48. The upper member 42 extends in a lateral direction. The lower member 48 also extends in the lateral direction and is provided below the upper member 42. The left stay 44 is substantially vertically oriented and connects the upper member 42 to the lower member 48. The right stay 46 is substantially vertically oriented and also connects the upper member 42 to the lower member 48.

With reference back to FIG. 1, the bumper beam 14 is disposed forward of the front end frame assembly 12. The bumper beam 14 is generally curved such that left and right end sections 14a, 14b are disposed rearward from a central section 14c. Left and right inner extension members 60, 62 connect the bumper beam 14 with the front end frame assembly 12. Left and right outer extension members 64, 66, which are disposed on respective external sides of the left and right inner extension members 60, 62, also connect the bumper beam 14 with the front end frame assembly 12. Not only do the left and right inner extension members 60, 62 and the left and right outer extension members 64, 66 connect the bumper beam 14 with the front end frame assembly 12, but the left and right inner extension members 60, 62 and the left and right outer extension members 64, 66 can also operate as impact absorbing members.

The vehicle body front structure 10 depicted in FIG. 1 is generally bilaterally symmetrical with respect to a longitudinal center line of the vehicle. FIGS. 2-5 depict components of the vehicle body front structure 10 on the right of side of the vehicle and will be explained in more detail below. Since the vehicle is symmetrical about the longitudinal center line, it is to be understood that the components of the vehicle body front structure 10 on the left side of the vehicle take a similar configuration.

Figure 2:
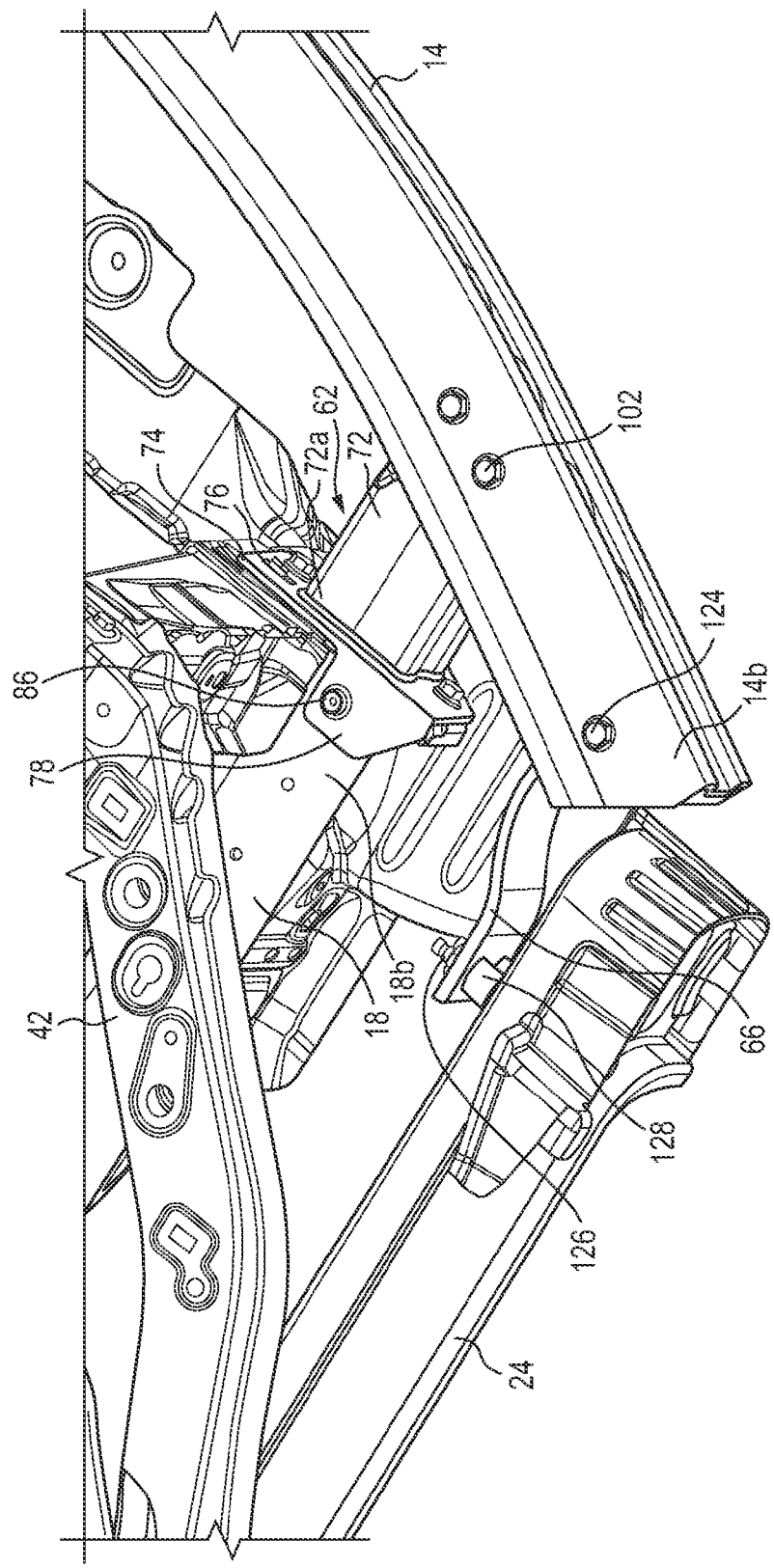
FIG. 2 is a partial side perspective view of the vehicle body front structure shown in FIG. 1.

With reference to FIG. 2, the right inner extension member 62 includes a hollow body 72 that is rectangular in a cross-section taken normal to the longitudinal direction. The hollow body 72 connects with a mounting plate 74 at a rear end 72a. The mounting plate 74 mounts to the right front side frame 18 and more particularly to a forward end 18a of the right front side frame 18. The mounting plate 74 includes a vertical section 76 and a horizontal flange 78. As more clearly seen in FIGS. 4 and 5, fastener openings 82 extend through the vertical section 76 to receive fasteners 84 to mount the right inner extension member 62 to the right front side frame 18. Similarly, a fastener opening (not visible) is formed through the horizontal flange 78 to receive a fastener 86 to connect the mounting plate 76, and thus the right inner extension member 62, to the right front side frame 18.

Figure 5:
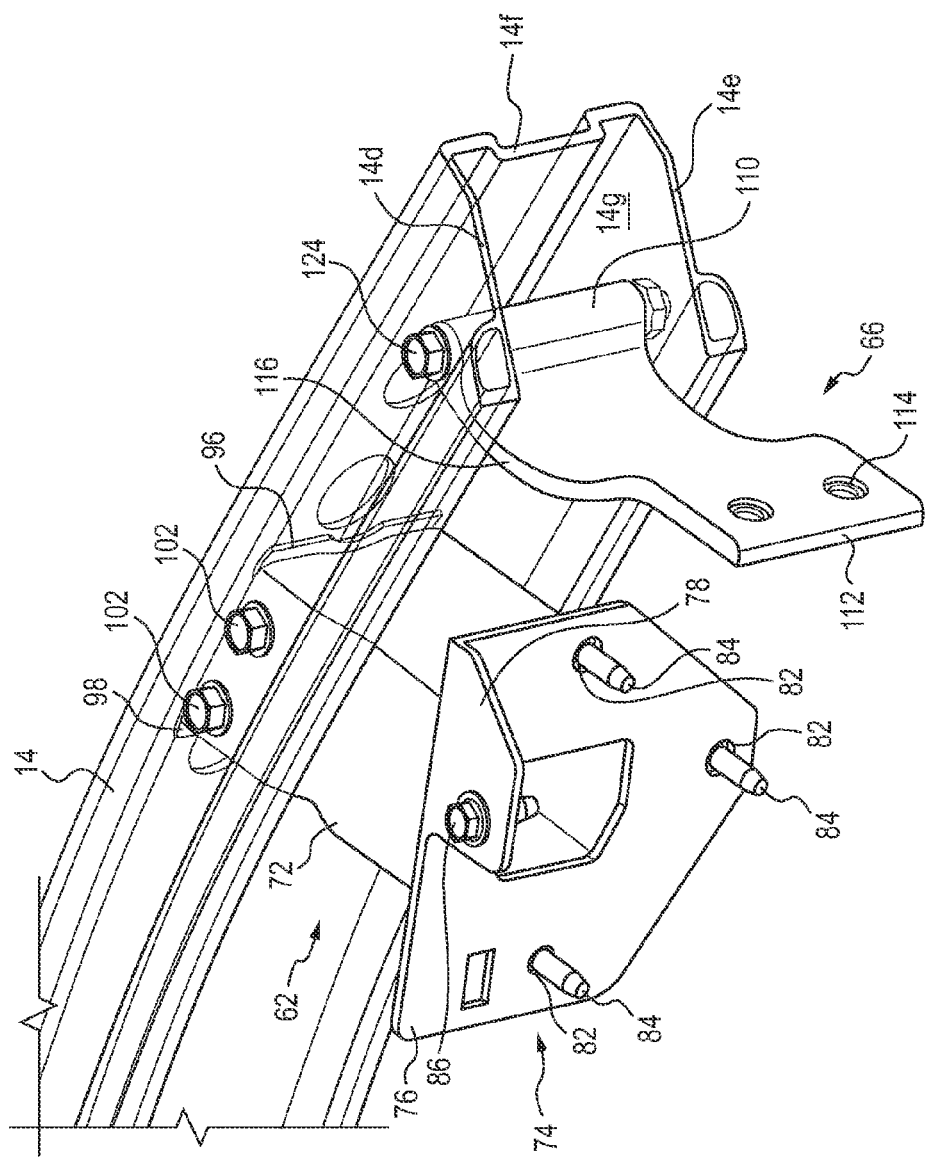
FIG. 5 is perspective view similar to FIG. 4 with the bumper beam shown as transparent to show the connection between the inner and outer extension members and the bumper beam.

With continued reference to FIG. 5, as depicted the bumper beam 14 is generally C-shaped in a cross-section taken normal to the lateral direction of the vehicle. The bumper beam can take other configurations. The bumper beam 14 includes a generally planar upper horizontal wall 14d, a generally planar lower horizontal wall 14e and a generally vertical wall 14f interconnecting the upper wall 14d to the lower wall 14e. The forward end section of the right inner extension member 62 is received within a channel 14g formed by the walls 14d, 14e and 14f of the bumper beam 14.

Figure 3:
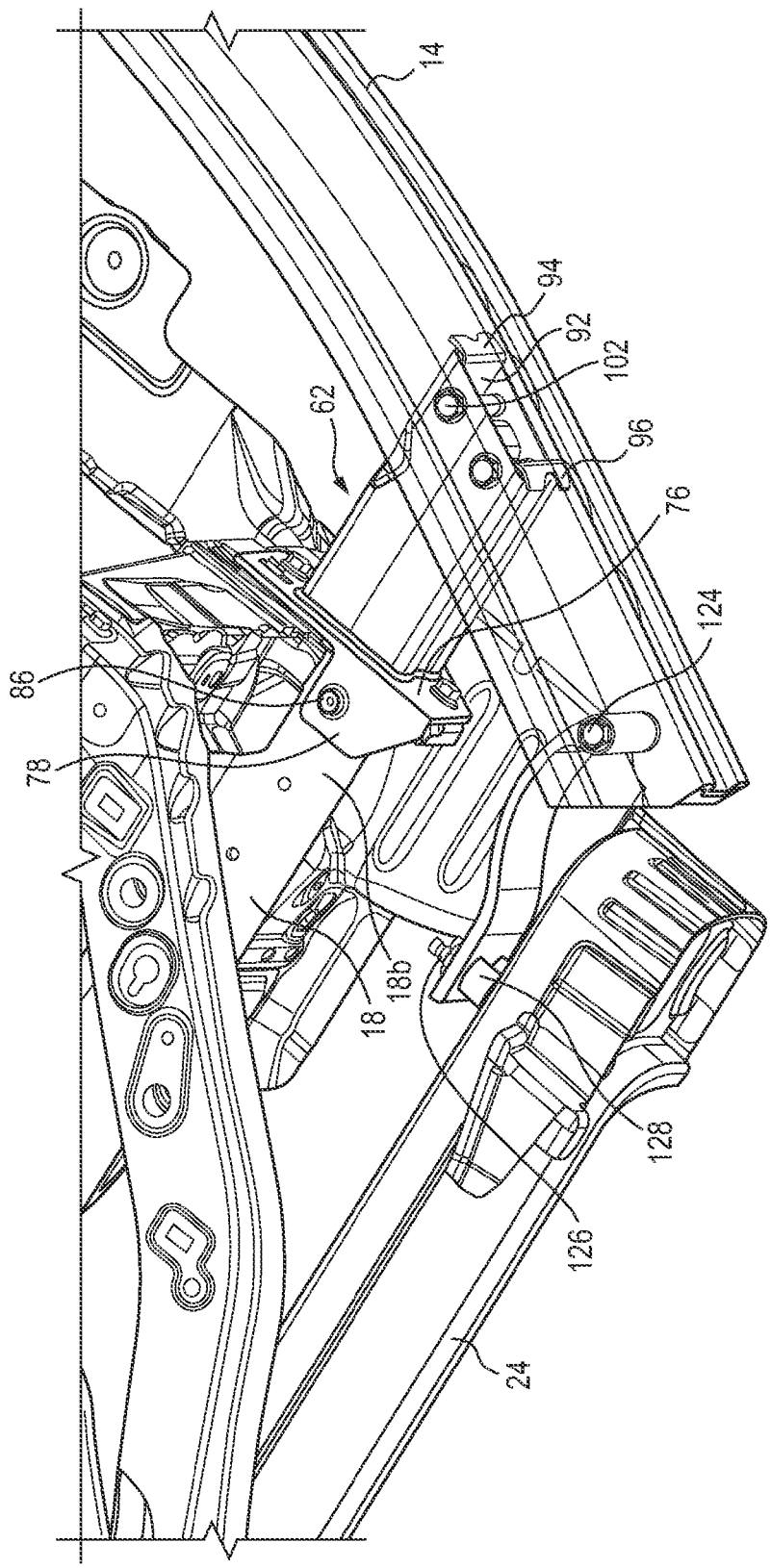
FIG. 3 is a partial side perspective view similar to FIG. 2; however, a bumper beam is shown as transparent to show the connection between the bumper beam and a front end frame assembly of the vehicle body front structure.
Figure 4:
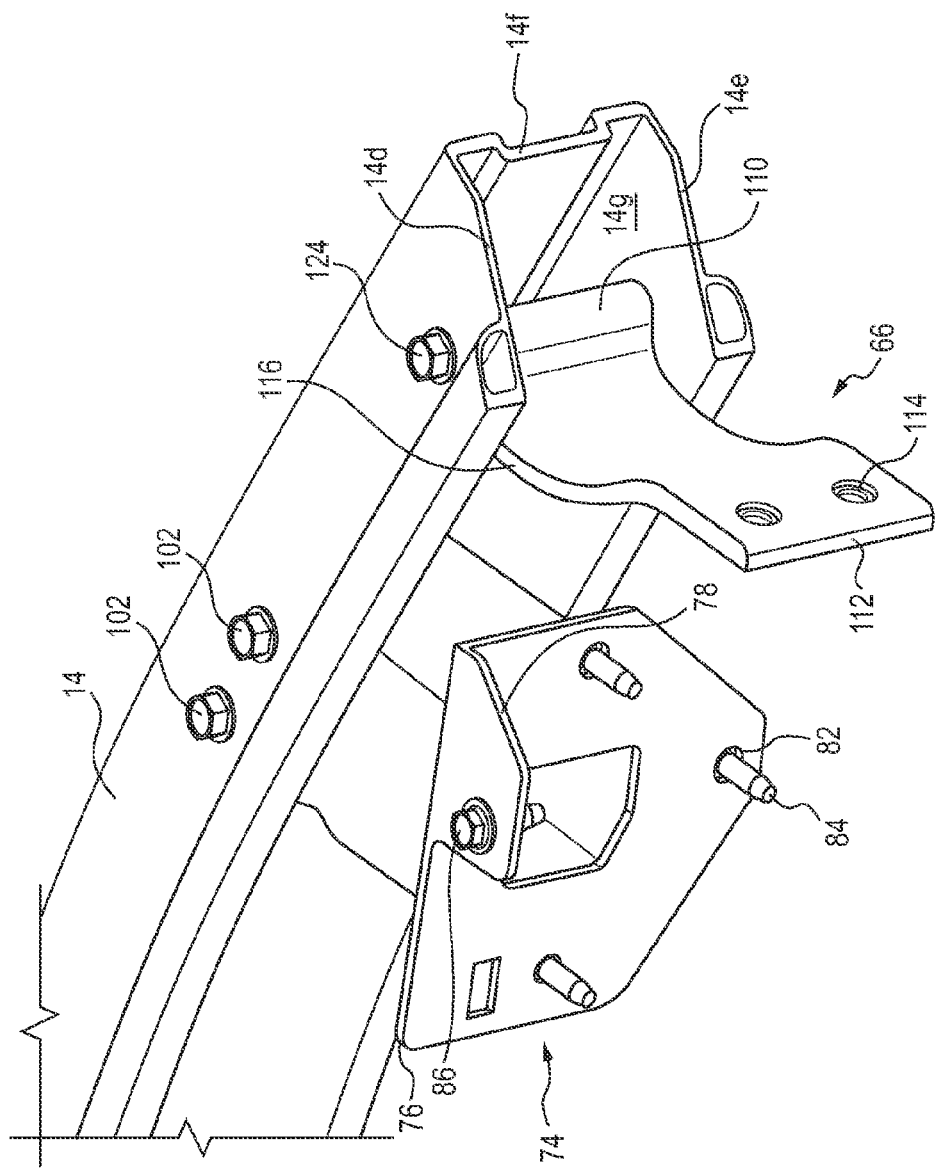
FIG. 4 is a perspective view of a rear side of the bumper beam of the vehicle body front structure and a respective inner and outer extension member for connecting the bumper beam to the front end frame assembly.

With reference to FIG. 3, the right inner extension member 62 includes a front bracket 92 having left and right forward flanges 94, 96 that are disposed adjacent an inner surface of the vertical wall 14f (FIG. 5) of the bumper beam 14. The hollow body 72 of the inner extension member 62 includes fastener openings (not visible) that receive fasteners 102 to connect the right inner extension member 62 to the bumper beam 14. The bumper beam 14 includes fastener openings (not visible) in each of the upper wall 14d and the lower wall 14e to connect the right inner extension member 62 to the bumper beam 14.

The right outer extension member 66 includes a forward end section 110 for connecting with the bumper beam 14, a rear end section 112, having connection locations 114 for connecting with the front end frame assembly 12 and a curved section 116 disposed between the forward end section 110 and the rear end section 112. The right outer extension member 66 has a generally plate-like configuration, having a vertical dimension greater than a horizontal dimension in a lateral direction of the vehicle. As such, the right outer extension member 66 does not have a conventional crush can configuration.

The left and right outer extensions 64, 66 allow the bumper beam 14 to be lighter in weight while also accommodating low speed crash events by controlling the ends 14a, 14b of the bumper beam 14 in tension to better support the center section 14c of the bumper beam. As more clearly seen in FIG. 1, the forward ends 22a, 24a of the left and right upper frames 22, 24 are offset rearwardly from respective ends 14a, 14b of the bumper beam 14. This allows for the bumper beam 14 to be extended in a vehicle lateral direction, which allows the bumper beam 14 to "catch" vehicles that impact the bumper beam 14 and that are offset to the extent that the oncoming vehicle is laterally outside of the front side frames 16, 18. For example, FIG. 6 depicts a small offset vehicle impact area 120. This area 120 is located outside of the front side frames 16, 18 and below the bumper beam 14. Impacts at this small offset vehicle impact area 120 place the respective outer extension 64 or 66 in tension and allows the bumper beam 14 to support the body front structure 10. FIG. 6 also depicts a narrow offset vehicle impact area 122. This narrow offset vehicle impact area 122 can be below the bumper beam 14 as well as above the bumper beam 14. The narrow offset vehicle impact area 122, nevertheless, is located outside the left and right front side frames 16, 18. An impact in this narrow offset vehicle impact area 122 places the respective outer extension 64, 66 in compression, which allows the bumper beam to support the vehicle body front structure 10. The curved shape of each outer extension member 64, 66 allows the respective extension member to first extend in tension and then bend in compression as the bumper beam 14 flattens. The curved shape and the thickness of each outer extension member 64, 66 can be designed to extend or compress at the appropriate loads for each crash mode. In the illustrated embodiment, each outer extension member 64, 66 has a generally constant thickness measured in a generally lateral direction from a rear end 64a, 66a of each outer extension member 64, 66 moving forward through the rear end section 112 (FIG. 5) and the curved section 116 (FIG. 5) to adjacent the forward end section 110 (FIG. 5).

With reference to FIG. 5, the forward end section 110 of the right outer extension member 66 includes a vertically extending bore (not visible) for receiving a fastener 124 to connect the bumper beam 14 with the right outer extension member 66. The fastener 124 defines a single axis about which the right outer extension member 66 can pivot while extending and/or compressing during a crash event. In an alternative arrangement, the right outer extension member 66 can include two (or more) vertically extending bores for receiving a fasteners, similar to fastener 124, to connect the bumper beam 14 with the right outer extension member 66.

The curved section 116 is disposed between the forward end section 110 and the rear end section 112. As more clearly seen in FIG. 1, the curved section 116 of the right outer extension member 66 curves laterally inwardly from the forward section 110 and the rear section 112. The curved section 116 allows the right outer extension 66 to lengthen during a crash event and maintain load carrying capacity.

The rear end section 112 of the right outer extension member 66 is for connecting with the right upper frame 24. The rear end section 112 has a plate-like configuration where the vertical dimension is greater than the horizontal dimension in a lateral direction of the vehicle. The vertical plane having the vertical dimension thereon is generally parallel to the longitudinal direction of the vehicle. In other words, the rear end section 112 is generally parallel to a longitudinal direction of the vehicle. This allows the right outer extension member 66 to be placed in both tension and compression.

As mentioned above, the rear end section 112 includes connection locations 114 for connecting with the front end frame assembly 12. In the illustrated embodiment, these connection locations are fastener openings 114. The fastener openings 114 extend horizontally in the lateral direction of the vehicle. With reference to FIG. 2, the fastener openings 114 (FIG. 5) receive fasteners 126 that extend inwardly from the right upper frame 24. The laterally extending fasteners 126 connect with the right upper frame 24 and are received in the openings 114 in the rear end section 112 of the right outer extension member 66. A respective collar 128 surrounds each laterally extending fastener 126. Each collar 128 contacts the right upper frame 24 and the right outer extension member 66 at the rear end section 112. The collar 128 offsets the right outer extension member 66 from the right upper frame 24. As such, the right outer extension member 66 is offset laterally inwardly from the right upper frame 24. The respective fasteners 126 and collars 128 provide a robust connection between the bumper beam 14 and the front end frame assembly 12 while still allowing the right outer extension member 66 to extend and compress during a crash event.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle body front structure for a vehicle comprising:
    a front end frame assembly disposed adjacent a forward end of the vehicle;
    a bumper beam disposed forward of the front end frame assembly;
    left and right inner extension members connecting the bumper beam with the front end frame assembly; and
    left and right outer extension members disposed on respective external sides of the left and right inner extension members and connecting the bumper beam with the front end frame assembly, wherein each outer extension member includes a forward end section for connecting with the bumper beam, a rear end section having connection locations for connecting with the front end frame assembly and a curved section disposed between the forward end section and the rear end section, wherein the rear end section has a plate—like configuration having a vertical dimension greater than a horizontal dimension in a lateral direction of the vehicle, a vertical plane having the vertical dimension thereon is generally parallel to a longitudinal direction of the vehicle.

2. The vehicle body front structure of claim 1, wherein the connection locations are openings extending through the rear end section.

3. The vehicle body front structure of claim 2, wherein the openings extend horizontally in the lateral direction of the vehicle.

4. The vehicle body front structure of claim 1, wherein each outer extension member includes at least one vertically extending bore for receiving a fastener to connect the bumper beam with the outer extension member.

5. The vehicle body front structure of claim 1, wherein each outer extension member includes a single vertically extending bore for receiving a fastener to connect the bumper beam with the outer extension member.

6. The vehicle body front structure of claim 1, wherein the front end frame assembly further includes:
    left and right longitudinally extending front side frames; and
    left and right upper frames disposed on respective external sides of the left and right front side frames.

7. The vehicle body front structure of claim 6, wherein the upper frames extend in an upward slope toward a rear of the vehicle.

8. The vehicle body front structure of claim 6, further comprising laterally extending fasteners connected with the upper frames and received in openings in the rear end section of the outer extension members.

9. The vehicle body front structure of claim 8, further comprising a respective collar surrounding each laterally extending fastener, wherein each collar contacts a respective outer extension member.

10. The vehicle body front structure of claim 9, wherein each outer extension member is offset laterally inwardly from the respective upper frame.

11. The vehicle body front structure of claim 8, wherein each outer extension member includes a vertically extending bore for receiving a fastener to connect the bumper beam with the outer extension member and each outer extension member is offset laterally inwardly from the respective upper frame.

12. The vehicle body front structure of claim 11, wherein the curved section curves laterally inwardly or outwardly from the forward section and the rear section.

13. A vehicle body front structure for a vehicle comprising:
    a front end frame assembly disposed adjacent a forward end of the vehicle including left and right longitudinally extending front side frames and left and right upper frames disposed on respective external sides of the left and right front side frames;
    a bumper beam disposed forward of the front end frame assembly;
    left and right inner extension members connecting the bumper beam with the front end frame assembly; and
    left and right outer extension members disposed on respective external sides of the left and right inner extension members and connecting the bumper beam with the front end frame assembly, wherein each outer extension member includes a forward end section for connecting with the bumper beam, a rear end section having connection locations for connecting with a respective upper frame and a curved section disposed between the forward end section and the rear end section, wherein at least the curved section and the rear end section has a plate—like configuration having a vertical dimension greater than a horizontal dimension, wherein the curved section curves laterally inwardly from the forward section and the rear section.

14. The vehicle body front structure of claim 11, wherein a vertical plane having the vertical dimension of the rear end section thereon is generally parallel to a longitudinal direction of the vehicle.

15. The vehicle body front structure of claim 11, further comprising laterally extending fasteners connected with the upper frames and received in openings in the rear end section of the outer extension members.

16. The vehicle body front structure of claim 15, further comprising a respective collar surrounding each laterally extending fastener, wherein each collar contacts a respective outer extension member to offset the respective outer extension member from the respective upper frame.

17. The vehicle body front structure of claim 16, wherein each outer extension member is offset laterally inwardly from the respective upper frame.

18. A vehicle body front structure for a vehicle comprising:
a front end frame assembly disposed adjacent a forward end of the vehicle including left and right longitudinally extending front side frames and left and right upper frames disposed on respective external sides of the left and right front side frames;
fasteners extending laterally inwardly from the upper members;
a bumper beam disposed forward of the front end frame assembly;
left and right inner extension members connecting the bumper beam with the front end frame assembly; and
left and right outer extension members disposed on respective external sides of the left and right inner extension members and connecting the bumper beam with the front end frame assembly, wherein each outer extension member includes a forward end section for connecting with the bumper beam, a rear end section having openings each for receiving a respective fastener for connecting with a respective upper member and a curved section disposed between the forward end section and the rear end section.

19. The vehicle body front structure of claim 18, wherein the rear end section has a plate—like configuration having a vertical dimension greater than a horizontal dimension in a lateral direction of the vehicle, a vertical plane having the vertical dimension thereon is generally parallel to a longitudinal direction of the vehicle.

20. The vehicle body front structure of claim 18, wherein each outer extension member has a generally constant thickness measured in a generally lateral direction from a rear end of the outer extension member moving forward through the rear end section and the curved section to adjacent the forward end section.

* * * * *

UNITED STATES PATENT AND TRADEMARK OFFICE
CERTIFICATE OF CORRECTION

| | | |
|---|---|---|
| PATENT NO. | : 8,662,566 B1 | Page 1 of 1 |
| APPLICATION NO. | : 13/834145 | |
| DATED | : March 4, 2014 | |
| INVENTOR(S) | : David Edwards et al. | |

It is certified that error appears in the above-identified patent and that said Letters Patent is hereby corrected as shown below:

On the title page, Item (72), "Walter Thom" should be --Walter Thorn--.

Signed and Sealed this
Twenty-first Day of October, 2014

Michelle K. Lee
*Deputy Director of the United States Patent and Trademark Office*